United States Patent
Wietelmann et al.

(10) Patent No.: US 12,057,573 B2
(45) Date of Patent: Aug. 6, 2024

(54) LITHIATED SILICON/CARBON COMPOSITE MATERIALS AND METHOD FOR PRODUCING THE SAME

(71) Applicant: ALBEMARLE GERMANY GmbH, Frankfurt am Main (DE)

(72) Inventors: Ulrich Wietelmann, Friedrichsdorf (DE); Ute Emmel, Frankfurt am Main (DE); Christopher Kurth, Bensheim (DE); Stefan Scherer, Griesheim (DE); Thorsten Buhrmester, Darmstadt (DE); Gerd Krämer, Bad Vilbel (DE)

(73) Assignee: ALBEMARLE GERMANY GmbH, Frankfurt am Main (DE)

( * ) Notice: Subject to any disclaimer, the term of this patent is extended or adjusted under 35 U.S.C. 154(b) by 0 days.

(21) Appl. No.: 18/150,897

(22) Filed: Jan. 6, 2023

(65) Prior Publication Data
US 2023/0163281 A1 May 25, 2023

Related U.S. Application Data

(60) Division of application No. 16/561,204, filed on Sep. 5, 2019, which is a continuation-in-part of application No. 15/546,746, filed as application No. PCT/EP2016/051680 on Jan. 27, 2016, now abandoned.

(51) Int. Cl.
| | |
|---|---|
| *H01M 4/38* | (2006.01) |
| *H01M 4/36* | (2006.01) |
| *H01M 4/583* | (2010.01) |
| *H01M 4/66* | (2006.01) |
| *H01M 10/0525* | (2010.01) |

(52) U.S. Cl.
CPC ........... *H01M 4/382* (2013.01); *H01M 4/364* (2013.01); *H01M 4/386* (2013.01); *H01M 4/583* (2013.01); *H01M 4/667* (2013.01); *H01M 10/0525* (2013.01)

(58) Field of Classification Search
CPC ...... H01M 4/382; H01M 4/364; H01M 4/386; H01M 4/583; H01M 4/667; H01M 10/0525; H01M 4/587; H01M 4/133; H01M 4/134; H01M 4/1393; H01M 4/1395; Y02E 60/10
See application file for complete search history.

(56) References Cited

U.S. PATENT DOCUMENTS

| | | | |
|---|---|---|---|
| 2004/0137327 A1* | 7/2004 | Gross | H01M 4/362 252/182.1 |
| 2013/0344392 A1 | 12/2013 | Huang et al. | |
| 2014/0287315 A1* | 9/2014 | Troegel | H01M 4/0471 252/502 |
| 2015/0000118 A1 | 1/2015 | Zhao et al. | |

FOREIGN PATENT DOCUMENTS

WO 2013104787 A1 7/2013

OTHER PUBLICATIONS

Datta et al., In Situ electrochemical synthesis of lithiated silcon-carbon based composites anode materials for lithium ion batteries, 2009, Elsevier, Journal of Power Sources, vol. 194, Issue 2, 1043-1052 (Year: 2009).*

Datta, M.K., et al., In sit electrochemical synthesis of lithiated silicon-carbon based composites anode materials for lithium ion batteries, Journal of Power Sciences, 2009, pp. 1043-1052, Issue 194, Elsevier B.V., all enclosed pages cited.

Lex-Balducci, A., et al., Electrolytes for Lithium-Ion Batteries, Green Chemistry and Chemical Engineering, 2011, pp. 147-196, CRC Press—Taylor & Francis Group, Boca Raton Florida, all enclosed pages cited.

International Search Report and Written Opinion of PCT Application No. PCT/EP2016/051680, mailed Jun. 10, 2016, all enclosed pages cited.

* cited by examiner

*Primary Examiner* — Helen Oi K Conley
(74) *Attorney, Agent, or Firm* — Troy S. Kleckley

(57) ABSTRACT

The invention relates to composite materials comprising lithiated or partially-lithiated graphite or graphene, and silicon having particles sizes from about 1 μm to about 100 μm, and that have an electrochemical rest potential less than about 2 V measured against Li/Li⁺, wherein graphitic material is mixed with silicon powder in a molar ratio of 9:1 to 1:9 and with lithium powder to an amount of the lithium in the composite material in the range of about 10 molar % to 100 molar % of the stochiometrically maximally possible lithium absorption, and to methods for production thereof.

7 Claims, No Drawings

LITHIATED SILICON/CARBON COMPOSITE MATERIALS AND METHOD FOR PRODUCING THE SAME

REFERENCE TO RELATED APPLICATIONS

This application is a divisional of U.S. application Ser. No. 16/561,204 dated Sep. 5, 2019, which is a continuation-in-part of U.S. application Ser. No. 15/546,746 dated Jul. 27, 2017, which is the National Stage of International Patent Application Number PCT/EP2016/051680, filed on Jan. 27, 2016, which in turn claims benefit of German Application Number 10 2015 201 461.4, filed on Jan. 28, 2015, the disclosures of which are incorporated herein by reference.

TECHNICAL FIELD

The invention relates to composite materials comprising Li, Si and C, wherein the electrochemical rest potential of these compounds is below approximately 2 V, preferably below 1 V, measured against Li/Li$^+$.

BACKGROUND

Silicon is one of the most-promising anode materials for lithium batteries of the next generation. The semimetal has an extremely high absorbing capacity for lithium via the mechanism of alloy formation: for example, the alloy $Li_{22}Si_5$ has a maximum theoretical capacity of 4200 Ah/kg, which is more than ten times higher than that of the graphites currently built into lithium ion batteries (372 Ah/kg). Unfortunately, the high volume changes (>300%) during charging/discharging result in a pulverizing and a separation of the connection from the current arrester so that a poor reversibility and an extremely rapid capacity drop take place. For graphene, a reversible capacity of up to 740 μmAh/g corresponding to a composition $LiC_3$ is considered to be possible, according to the document US 2015/0000118 A1.

The electrochemical properties of silicon can be improved by reducing the particle sizes in the submicron range, by alloy formation with other elements, nanostructuring of electrodes or by admixing components which buffer the volume change (e.g., carbon).

When using silicon as anode material in lithium batteries there is another problem in that very high, irreversible losses are recorded during the first charge/discharge cycle. They can be traced back primarily to the content of foreign elements such as, e.g., oxygen, hydrogen and inorganic carbon (e.g., carbonate). The foreign elements react irreversibly with lithium to electrochemically inactive products such as lithium oxides, lithium carbonate, lithium carbide, lithium hydroxide, etc.

An improved anode material mainly based on silicon is sought.

This material should be able to be produced by a commercially advantageous process.

DESCRIPTION OF THE INVENTION

The problem is solved with composite materials of this invention comprising lithiated or partially-lithiated graphite or graphene and silicon having particle sizes from about 1 μm to about 100 μm, and having an electrochemical rest potential less than about 2 V measured against Li/Li$^+$. Such composite materials can also comprise metallic lithium. Further, such composite materials can have a coating layer comprising functional groups or molecular constituents that have reacted with lithium that was available on the composite materials' surfaces, including wherein the coating layer is applied with one or more gaseous or liquid coating means.

Also provided are methods for producing composite materials comprising combining (i) a graphitic material with particle sizes from about 5 μm to about 200 μm and a silicon powder with particle sizes from about 1 μm to about 100 μm in a molar ratio of 9:1 to 1:9 with (ii) a lithium powder with a particle sizes from about 5 μm to about 500 μm under inert gas conditions to form a combination and mechanochemically converting the combination in a temperature range of about 0° C. to about 120° C. under inert gas or in a vacuum, into the composite materials, wherein the amount of lithium in the composite materials is in the range of about 10 molar % to about 100 μmolar % of the stochiometrically maximally possible lithium absorption. Included are such methods wherein the mechanochemically converting is conducted in a temperature range of about 20° C. to about 100° C., and/or such methods comprising also combining metallic lithium particles having sizes between about 5 μm to about 500 μm to form the combination. Also provided are such methods comprising subjecting the produced composite materials to a temperature of about 150° C. to about 350° C. for about 5 minutes to about 24 hours. Also provided are such methods additionally comprising applying to the produced composite materials a coating layer comprising functional groups or molecular constituents such that the functional groups or molecular constituents react with lithium available on the composite materials' surfaces, including applying the coating layer via a gaseous coating agent or a liquid coating agent, and wherein the gaseous coating agent is selected from $N_2$, $CO_2$, CO, $O_2$, $N_2O$, NO, $NO_2$, HF, $F_2$, $PF_3$, $PF_5$, and $POF_3$, and the liquid coating agent is selected from carbonic acid esters, vinyl ethylene carbonate, ethylene carbonate, propylene carbonate, dimethyl carbonate, diethyl carbonate, ethyl methyl carbonate, fluoroethylene carbonate; lithium chelateoborate solutions in organic solvents, and inorganic compounds.

Also covered by the present invention is the use of composite materials that comprise lithiated or partially-lithiated graphite or graphene and silicon particles having sizes from about 1 μm to about 100 μm, and that have an electrochemical rest potential less than about 2 V measured against Li/Li$^+$, as anode material in galvanic cells with non-aqueous electrolytes and/or as anode materials in lithium batteries.

The composite materials that comprise lithiated or partially-lithiated graphite or graphene, and silicon particles having sizes between 1 to 100 μm, and that have an electrochemical rest potential less than about 2 V measured against Li/Li+, can be used as anode material in galvanic cells with non-aqueous electrolytes.

Preferably, the composite materials that comprise lithiated or partially-lithiated graphite or graphene, and silicon particles having sizes between 1 to 100 μm, and that have an electrochemical rest potential less than about 2 V measured against Li/Li+, can be used as anode material in lithium batteries.

The amount of the lithium in the composite materials of this invention is in the range of about 10 to 100 μmolar % of the stochiometrically maximally possible lithium absorption ($LiC_6$ and $Li_{22}Si_5$ are the thermodynamically Li-richest stable phases at room temperature). The production of the composite materials of the invention takes place for example via a grinding process which can be optionally combined with a tempering process. To this end, the graphitic material (for example graphite powder with particle sizes between 5 and 200 μm or graphene powder) is mixed with silicon powder (particle size 1 to 100 μm) in a molar ratio of 9:1 to 1:9 and with lithium powder (particle size 5 to 500 μm) under inert gas conditions (e.g., Ar) and is subsequently compressed or ground. At this time Li-graphite intercalates with the composition $LiC_o$ (o=e.g., 6 or 12), meaning that lithium atoms are intercalated in graphite in a molar ratio of 1:6 or 1:12, surprisingly form at first, whereas no or only an entirely subordinate reaction or alloy formation takes place between silicon and lithium metal.

The mechanically induced conversion takes place in the temperature range between 0 and 120° C., preferably 20 to 100° C. either in vacuum or under an atmosphere whose components do not react or only acceptably slowly react with metallic lithium, silicon and/or lithium graphite intercalation compounds. This is preferably either dry air or a noble gas, especially preferably argon.

The lithium is added in powdery form comprising particles with an average particle size between about 5 and 500 μm, preferably 10 and 200 μm. Coated powders such as, e.g., a stabilized metallic powder offered by the FMC company (Lectromax powder 100, SLMP) with a lithium content of at least 97 wt % or, for example, a powder coated with alloy-forming elements and with metallic contents of at least 95 wt % (WO2013/104787A1) are used. Non-coated lithium powders with a metallic content of ≥99 wt % are especially preferably used. For a use in the battery area the purity regarding metallic contaminations must be very high. Among other things, the sodium content must not be >200 ppm. The Na content is preferably ≤100 ppm, especially preferably ≤80 ppm.

All powdery graphite qualities, both those from naturally occurring ones (so-called "natural graphite") as well as synthetically/industrially produced types ("synthetic graphites") can be used as graphite. Macrocrystalline flake graphites as well as amorphous or microcrystalline graphites can be used. As regards graphenes, there is basically no limitation. However, the oxygen content should be below 5 wt %, preferably below 1 wt %. The silicon powder has a content of at least 80 wt % Si, preferably at least 90 wt % Si; and the remainder substantially comprises oxygen.

The conversion (that is the lithiation or partial lithiation) of the graphite or graphene takes place during admixing, compression and/or grinding of the two components lithium powder and graphite-or graphene powder in the presence of the Si powder. The grinding can take place by mortar and pestle on a laboratory scale. However, the conversion preferably takes place in a mechanical mill, for example, a rod mill, oscillating mill or ball mill. The conversion is especially advantageously carried out in a planet ball mill. To this end, e.g., the planet ball mill Pulverisette 7 premium line from the Fritsch company can be used on a laboratory scale. When using planet ball mills very advantageously short reaction times of <10 h, frequently even <1 h can be surprisingly achieved.

The mixture of lithium powder and graphite powder is preferably ground in the dry state. However, a fluid which is inert to both substances can also be added up to a weight ratio of up to 1:1 (sum of Li+C+Si:fluid). The inert fluid is preferably a non-aqueous hydrocarbon solvent, e.g., a liquid alkane or alkane mixture or an aromatic hydrocarbon mixture. The vigorousness of the grinding process is dampened and the graphite particles are groundless strongly by the addition of solvents.

The grinding time is a function of various requirements and process parameters:
- weight ratio of grinding balls to product mixture
- type of grinding balls (e.g., hardness and density)
- intensity of the grinding (frequency of rotation of the grinding plate)
- reactivity of the lithium powder (e.g., type of coating)
- weight ratio of Li:C
- product-specific material properties
- desired particle size, etc.

The conditions can be discovered by a person skilled in the art by simple optimizing experiments. In general, the grinding times fluctuate between 5 minutes and 24 hours, preferably between 10 μminutes and 10 hours. After the end of the mechanochemical conversion a composite is present consisting of lithiated or partially lithiated graphite/graphene powder, largely unchanged Si-Powder and lithium metallic remainders.

These lithiated or partially lithiated composite powders are "active" to environmental conditions (air and water) and to many functionalized solvents (e.g., NMP) and liquid electrolyte solutions, i.e. they react or decompose upon rather long exposure times. When stored in normal air the contained lithium reacts under the development of hydrogen to thermodynamically stable salts such as lithium hydroxide, lithium oxide and/or lithium carbonate. In order to at least largely avoid this disadvantage, the lithiated or partially lithiated composite powders can be stabilized by a second process step, a coating method. To this end the lithiated or partially lithiated composite powder is passivated with a gaseous or liquid coating agent. The coating agents used contain, compared to metallic lithium and lithium graphite intercalation compounds or lithium graphene intercalation compounds, reactive functional groups or molecular constituents and they therefore react with the lithium available on the surface. The conversion of the lithium-containing surface zone takes place under the formation of lithium salts such as, e.g., lithium carbonate, lithium chloride, lithium hydroxide, lithium alcoholates, lithium carboxylates, etc.) which are non-reactive or only slightly reactive to air (therefore thermodynamically stable). In this coating procedure the greatest part of the lithium which is not present on the particle surface (e.g. of the intercalated component) remains in active form, i.e., with an electrochemical potential of ≤1 V vs. $Li/Li^+$. Such coating means are known from lithium ion battery technology as in-situ film producers (also designated as a SEI producers) for the negative electrodes and are described, for example, in the following survey article: A. Lex-Balducci, W. Henderson, S. Passerini, *Electrolytes for Lithium Ion Batteries, in Lithium-Ion Batteries, Advanced Materials and Technologies*, X. Yuan, H. Liu and J. Zhang (Hrsg.), CRC Press Boca Raton, 2012, p. 147-196. Coating agents used are cited by way of example in the following. Suitable gases are $N_2$, $CO_2$, CO, 02, $N_2O$, NO, $NO_2$, HF, $F_2$, $PF_3$, $PF_5$, $POF_3$ and the like. Liquid coating agents used are, for example: carbonic acid esters (e.g., vinylene carbonate (VC), vinyl ethylene carbonate (VEC), ethylene carbonate (EC), propylene carbonate (PC), dimethyl carbonate (DMC), diethyl carbonate (DEC), ethyl methyl carbonate (EMC), fluoroethylene carbonate (FEC)); lithium chelateoborate solutions (e.g., lithium bis(oxalato) borate (LiBOB), lithium bis(salicylato)borate (LiBSB), lithium bis(malonato)borate (LiBMB), lithium difluorooxalatoborate (LiDFOB) as solutions in organic solvents, preferably selected from: oxygen-containing heterocycles such as THF, 2-methyl-FHF, dioxolan; carbonic acid esters (carbonates) such as ethylene carbonate, propylene carbonate, dimethyl carbonate, diethyl carbonate and/or ethyl methyl carbonate; nitriles such as acetonitrile, glutarodinitrile; carboxylic acid esters such as ethylacetate, butylformiate and ketones such as acetone, butanone; sulfur-organic compounds (e.g., sulfites, (vinylethylene sulfite, ethylene sulfite); sulfones, sultones and the like); N-containing organic compounds (e.g., pyrrole, pyridine, vinylpyridine, picolines, 1-vinyl-2-pyrrolidinone); phosphoric acid; organic, phosphorus-containing compounds (e.g., vinyl phosphonic acid); fluorine-containing organic and inorganic compounds (e.g., partially fluorinated hydrocarbons, $BF_3$, $LiPF_6$, $LiBF_4$), silicon-containing compounds (e.g., silicon oils, alkyl siloxanes) among others.

When using liquid coating agents the coating process generally takes place under an atmosphere of inert gas (e.g., argon protective atmosphere) at temperatures between 0 and 150° C. In order to increase the contact between the coating agent and the lithiated or partially lithiated composite powder, mixing or agitating conditions are advantageous. The necessary contact time between the coating agent and the lithiated or partially lithiated composite powder is a function of the reactivity of the coating agent, of the prevailing temperature and of other process parameters. In general, times between 1 minute and 24 hours are appropriate.

The coating not only improves the handling properties and the safety in the production of electrodes (generally anodes) but also the properties of use in an electrochemical battery cell. When pre-coated anode materials are used, the in situ formation of an SEI (solid electrolyte interface) is eliminated upon contact of the lithiated or partially lithiated composite anode material with the liquid electrolyte of the battery cell. The anode filming brought about outside of the electrochemical cell by pre-coating corresponds in its properties to a so-called artificial SEI. In the ideal case the otherwise necessary forming process of the electrochemical cell is eliminated or it is at least simplified.

The composite products lithiated or partially lithiated and stabilized according to the above-described method can be used to produce battery electrodes. For this, they are mixed and homogenized under inert or dry spatial conditions with at least one binder material and optionally with a conductivity-improving additive (e.g., blacks or metallic powder, e.g., Ni powder or Ni foam) and with an organic solvent and this dispersion is applied by a coating method (casting method, spin coating or airbrush method) onto a current arrester and dried. The stabilized lithiated or partially lithiated composite powders produced according to the method of the invention are surprisingly not very reactive to N-methylpyrrolidone (NMP) and to other functionalized, organic solvents. Therefore, they can be processed with NMP and the binder material polyvinylidene fluoride (PVdF) to a castable or sprayable dispersion. Other examples for suitable binder materials are, among others: carboxymethyl cellulose (CMC), polyisobutylene (e.g., OPPANOL of the BASF Company), alginic acid.

In a preferred variant of the method according to the invention the described, non-coated, lithiated or partially lithiated composites are subjected following the mechanochemical conversion to a temperature step at temperatures between 100 and 350° C., preferably between 150 and 250° C. During a tempering time of 5 minutes to 24 h a conversion takes place between the lithiated or partially lithiated graphite-/graphene compounds and optionally any elementary (metallic) lithium still present to alloys of lithium and silicon (lithium silicides, e.g. $Li_7Si_3$). Upon maintaining sufficient storage times at a certain temperature it is possible to extract all lithium intercalated in the graphite or graphene and to use it for the production of the lithium silicides. In this manner a silicide composite is produced in the extreme case which consists of lithium-free or very lithium-poor graphite/graphene and lithium silicides. The exact composition results from the stoichiometry of the reaction batch.

In a variant of a method the silicide composite materials of the invention can also be produced by mixing separately produced, powdery $LiC_o$ intercalation compounds (o=30 to 6) with silicon powder (1-100 µm particle size) in the desired molar ratio and in possibly a subsequent thermolysis phase (130 to 350° C. for 5 min to 24 h, preferably 140-300° C. Use of the term "$LiC_o$ intercalation compounds (o=30 to 6)" means that lithium atoms are intercalated in graphite in a molar ration from 1:30 up to 1:6.

It was surprisingly found that the non-coated, lithiated or partially lithiated composites as well as the silicide composites in contact with electrolytic solutions and carbonate solvents are more stable than pure lithium-graphite intercalation compounds. As an example, the following beginnings of an exothermal decomposition reaction can be observed for composites produced in the molar ratio Si:Li:C=1:2.7:3.9, when stored in a mixture of ethylene carbonate/ethyl methyl carbonate (EC/EMC, 1:1 w/w) in DSC experiments with the Radex system of the Systag company:

Non-coated lithium graphite intercalation compound $LiC_6$ (Li content=8.8 weight %) $T_{onset}$=130° C.

Non-thermolyzed Li/Si/C— composite with the composition $Li_{2.7}SiC_{3.9}$ (Li content=28.5 weight %): $T_{onset}$=170° C.

At 150° C. 4 hours thermolyzed Li/Si/C— composite with the composition $Li_{2.7}SiC_{3.9}$ (Li content=28.5 weight %): $T_{onset}$=140° C.

At 250° C. 10 hours thermolyzed Li/Si/C— composite with the composition $Li_{2.7}SiC_{3.9}$ (Li content=28.5 weight %): $T_{onset}$=150° C.

In spite of the lithium concentration in the composite materials according to the invention, which is significantly higher in comparison to $LiC_6$, the materials according to the invention have an improved thermal stability compared to an EC/EMC mixture.

Furthermore, it was surprisingly found that the composite materials are not self-igniting in air as a rule. This is the opposite of the behavior of non-coated $LiC_6$.

The electrochemical rest potential of the composite material of the invention is below about 2 V, preferably below 1 V measured against $Li/Li^+$.

The composite materials according to the invention can be used as high-capacitive anode materials for galvanic cells with non-aqueous electrolytes, for example lithium batteries.

Example 1

A mixture consisting of:
1.80 g (64 mmol) Si powder (supplier Wacker, Si content 89.4 wt %, $D_{50}$=58 µm)
1.16 g (167 mmol) Li powder (Rockwood Lithium, non-coated, Li content>99 wt %,
$D_{50}$=105 µm)
3.00 g (250 µmmol) graphite powder (SLP 30 from the Timcal company)
was ground together with 26 $ZrO_2$ balls, diameter 3 mm 4 h at 400 rpm in a reversion operation in a planet ball mill Pulverisette P 7 with a zirconium oxide grinding cup from the Fritsch company in a glove box filled with Ar. This composition of mixture is within the claimed ranges:

64 mmol Si can accommodate max. 282 mmol Li according to the limiting stoichiometry Li22Si5

250 μmmol graphite can accommodate max. 42 mmol Li according to the limiting stoichiometry LiC6.

The maximum Li uptake capacity of this quantity of mixture is therefore 324 mmol, which is 52 molar % of the lithium metal quantity (167 mmol) used.

5.56 g of a golden-brown powder was obtained. The phases $LiC_{12}$, $LiC_6$, Si metal, and Li metal can be identified in this product by powder x-ray diffractometry. Graphite and Li/Si alloys cannot be identified.

The product surprisingly proved to be non-self-igniting in air. It vigorously reacts with N-methylpyrrolidone after a short time.

Example 2

1.05 g of a mixture produced according to example 1 are thermolyzed in closed steel autoclaves in Ar protective gas for 4 hours at 150° C. Subsequently, the following phases can be identified by XRD: lithium silicides, graphite and Si (reduced intensity). Metallic lithium cannot be identified.

The product is not self-igniting in air. It reacts mildly with NMP at room temperature.

Example 3

1.16 g of a mixture produced according to example 1 are thermolyzed in closed steel autoclaves in Ar protective gas for 10 hours at 250° C. Subsequently, the following phases can be identified by XRD: lithium silicides (elevated intensity), graphite and Si (greatly reduced intensity). Metallic lithium cannot be identified.

The product is not self-igniting in air. It reacts only extremely weakly with NMP at room temperature.

The examples show the production of Li/C/Si composites with a high lithium content (52 wt % of maximum lithium capacity) and their qualitative composition. A thermal post-treatment improves the stability to reactive solvents shown, for example, on a mixture with N-methyl pyrrolidone.

The invention claimed is:

1. A method for producing composite materials comprising combining (i) a graphitic material with particle sizes from about 5 μm to about 200 μm and a silicon powder with particle sizes from about 1 μm to about 100 μm in a molar ratio of 9:1 to 1:9 with (ii) a lithium powder with a particle sizes from about 5 μm to about 500 μm under inert gas conditions to form a combination and mechanochemically converting the combination in a temperature range of about 0° C. to about 120° C. under inert gas or in a vacuum, into the composite materials, wherein the amount of lithium in the composite materials is in the range of about 10 μmolar % to about 100 μmolar % of the stochiometrically maximally possible lithium absorption.

2. The method of claim 1, wherein the mechanochemically converting is conducted in a temperature range of about 20° C. to about 100° C.

3. The method of claim 1 comprising also combining metallic lithium particles having sizes between about 5 μm to about 500 μm to form the combination.

4. The method of claim 2 further comprising subjecting the produced composite materials to a temperature of about 150° C. to about 350° C. for about 5 minutes to about 24 hours.

5. The method of claim 1 additionally comprising applying to the produced composite materials a coating layer comprising functional groups or molecular constituents such that the functional groups or molecular constituents react with lithium available on the composite materials' surfaces.

6. The method of claim 5 comprising applying the coating layer via a gaseous coating agent or a liquid coating agent.

7. The method of claim 6, wherein the gaseous coating agent is selected from $N_2$, $CO_2$, CO, $O_2$, $N_2O$, NO, $NO_2$, HF, $F_2$, $PF_3$, $PF_5$, and $POF_3$, and the liquid coating agent is selected from carbonic acid esters, vinyl ethylene carbonate, ethylene carbonate, propylene carbonate, dimethyl carbonate, diethyl carbonate, ethyl methyl carbonate, fluoroethylene carbonate; lithium chelateoborate solutions in organic solvents, and inorganic compounds.

* * * * *